Jan. 9, 1962 E. A. EDMONDS 3,016,067
LIQUID DISTRIBUTING DEVICE

Filed Aug. 11, 1960

INVENTOR.
EUGENE A. EDMONDS, DECEASED.
BY
ATTORNEY 3,016,067
Patented Jan. 9, 1962

3,016,067
LIQUID DISTRIBUTING DEVICE
Eugene A. Edmonds, deceased, late of Jefferson County, Ky., by Dolly B. Edmonds, executrix, Jefferson County, Ky., assignor to Henry Vogt Machine Company, Louisville, Ky., a corporation of Kentucky
Filed Aug. 11, 1960, Ser. No. 48,945
3 Claims. (Cl. 138—38)

Conventional vertical tubular heat exchangers comprise: upper and lower liquid headers vertically spaced from each other; a bank of vertical heat exchange tubes interconnecting the upper and lower headers; and a liquid distributing ferrule positioned in the upper end of each tube to direct the flow of liquid from the upper header into the tube. It has been proposed to provide each ferrule with two or more water-directing grooves extending diagonally downward so that a uniform distribution of water in the form of a thin film is secured. But such ferrules, like most, normally suffer from one or more disadvantages. Among these is an inability to perform satisfactorily except when operating within a narrow range of liquid heads in the upper header. For example, with liquid heads below this range, the liquid may drip down through the center of the tube, while, with heads above this range, the liquid may flood the tube. Another disadvantage is an inability to "wet" a substantial part of the upper portion of the tube, a failure which correspondingly reduces the efficiency of the heat exchange operation. Other disadvantages include: high cost of manufacture; and low adaptability or flexibility due to the use of a complex shape or the necessity of adhering to close manufacturing tolerances.

The primary object of this invention is to provide a liquid distributing ferrule which, due to its novel construction, will eliminate or substantially minimize the above disadvantages.

Another important object is to provide a novel form of ferrule which will perform satisfactorily over a wide range of operating conditions, which will distribute the liquid in such a way as to cause it to form a thin uniform film in the extreme upper portion of the tube and thereby insure a uniform flow over substantially the entire inner surface of the tube.

Other important objects of this invention reside in the provision of a liquid distributing ferrule which will operate satisfactorily under high, intermediate and low liquid heads in the upper header, which will not drip at low liquid heads so as to allow liquid to drop down through the center of the tube without touching the tube walls, which will not flood at high liquid heads so as to allow liquid to flow down through the tube in a form other than a thin film, which has a simple shape and construction rendering it inexpensive to manufacture and which does not have to be made to close manufacturing tolerances.

In general, these objects are attained by providing a suitably shaped ferrule body adapted to seat in the upper end of a heat exchanger tube, forming or otherwise providing the body with an internal bore or chamber which is closed at the top, wide open at its bottom and formed, inbetween, by circular side walls extending around a vertical axis, and further providing the body with several passageways spaced uniformly around the side wall periphery of the ferrule and arranged to extend horizontally inward from the outer periphery of the ferrule and through the ferrule body in such a way as to discharge tangentially into the chamber. These passageways are arranged to deliver liquid streams tangentially in the same rotary direction around the chamber side walls.

Since each liquid stream tangentially enters the horizontally circular ferrule chamber, it tends to flow horizontally in a circular path. The action of gravity, however, causes it to flow in a helical path of increasing pitch such that it soon flows in a straight axially-downward direction. However, as a result of its initial horizontal or circular flow, one stream tends to join the next in the extreme upper end portion of the tube even under low operating liquid heads. This joinder produces a film extending continuously around the entire circumference of the ferrule and, once a continuous film of this type is circumferentially formed, it may be expected to maintain its circumferential continuity as it flows axially downward to the lower discharge end of the tube. As a consequence, the interior surface of the tube is completely wetted substantially throughout its entire length.

The invention is illustrated in the accompanying drawing wherein.

*Heat exchanger*

Figure 1:
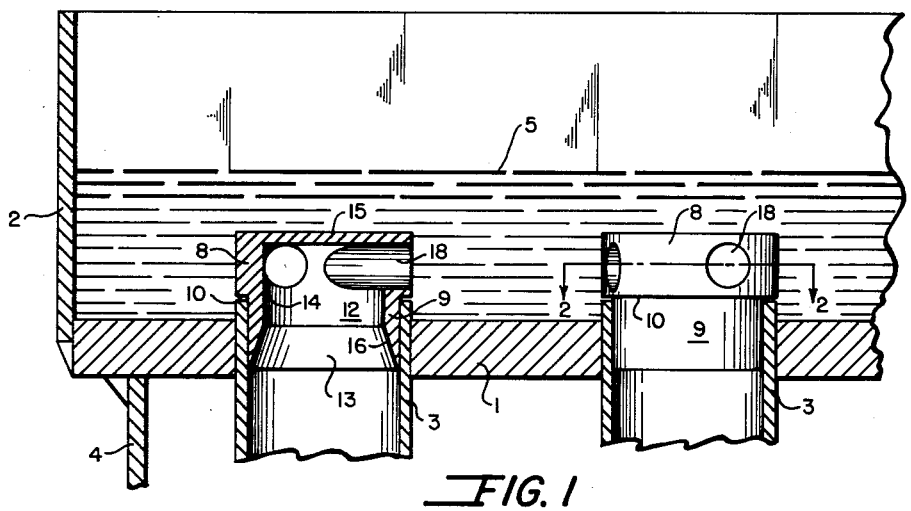
FIG. 1 is a fragmentary vertical section taken through the upper header of a vertical tubular heat exchanger and showing a pair of liquid distributing ferrules made according to the invention and being seated in the upper end of the heat exchanger's vertical tubes, one ferrule being shown in vertical cross-section and the other in elevation.

The vertical tubular heat exchanger fragmentarily shown in FIG. 1 is conventional and includes: an upper header 1 including a horizontal tube sheet, also designated 1, and a surrounding vertical side wall 2; a lower header (not shown) spaced below the upper header 1; a bank of vertical tubes 3, of which two are shown, joining the upper and lower headers together and secured to and extending upwardly through the tube sheet 1 with their upper ends terminating a short distance above the tube sheet; and a casing or shell 4 joining the two headers and surrounding the space occupied by the tubes, said casing being welded or otherwise secured to the bottom of the tube sheet 1. Under normal operating conditions, a heat exchange liquid is contained in the upper header 1 and flows downwardly through the tubes 3 to be discharged into the lower header. This heat exchange liquid is shown in FIG. 1 as having the level 5.

Figure 2:
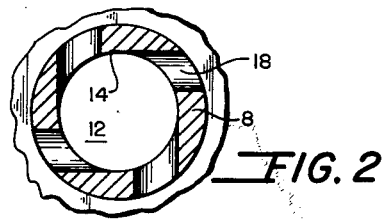
FIG. 2 is a horizontal section taken on the line 2—2 of FIG. 1.

*Liquid distributing ferrule—FIGS. 1 and 2*

The upper end of each tube 3 is provided with a liquid distributing ferrule 8, which controls and limits the amount of liquid entering the tube. The ferrule 8 includes a cylindrical body, also designated 8, having an upper head portion and a lower circular neck portion 9 joined together. The neck portion is dimensioned to fit snugly within the upper end of the tube. The head portion is circumferentially larger than the neck portion to provide a downwardly facing shoulder 10 for seating the ferrule on the upper end edge of the tube 3. Flush engagement between the shoulder 10 and the end of the tube 3 bans seepage between the ferrule 8 and the tube 3.

A downwardly open vertical cylindrical chamber or bore 12 is provided in the ferrule 8. This chamber 12 has its open lower end 13 in wide open communication with the tube 3 and is enclosed on its sides by the annular side wall 14 and at its upper end by a top wall 15. The lower end or edge of the annular side wall 14 is beveled downwardly and outwardly to provide a chamfer 16 smoothly bridging the inner surface of chamber 12 and the interior of the tube 3.

Several inlet passageways 18 are formed in the head portion of the ferrule to extend horizontally through the annular side wall 14 of the ferrule 8 from an inlet opening on the outer side of wall 14 to an outlet opening on the inner side of that wall. These passageways 18 are angularly spaced from each other at substantially equal intervals around the vertical axis of the ferrule and all lie in substantially the same horizontal plane. Each passageway is directed to deliver its liquid stream substantially tangentially into chamber 12 with all passageways delivering their streams in the same rotary direction.

The streams delivered by the multiple inlet passageways 18 quickly connect with each other within the chamber 12 to form a thin hollow rotating cylinder of water on the circumferential wall of ferrule chamber 12. This water cylinder travels downwardly through the lower open end 13 of the chamber 12, during which it expands outwardly over the chamfer 16 at the lower end of the ferrule and flows onto the interior surface of the tube 3. In this way, the extreme upper end portion of the tube is wetted with a continuous film which flows downwardly over the entire inner surface of the tube so as to wet it from the lower end of the ferrule (if not from within the ferrule itself) to the lower end of the tube 3.

Figure 3:
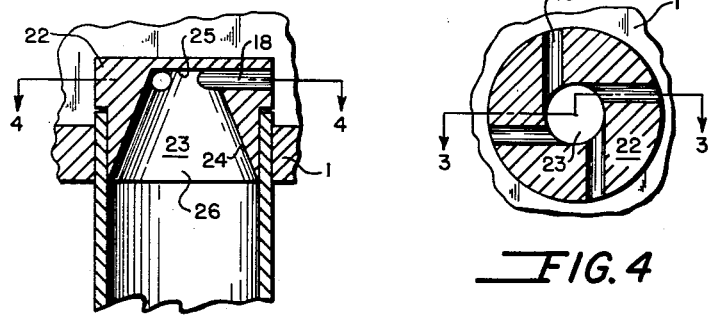
FIG. 3 is a vertical section of another embodiment of the ferrule and is taken on the line 3—3 of FIG. 4.
Figure 4:
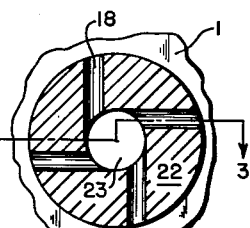
FIG. 4 is a horizontal section taken on the line 4—4 of FIG. 3.

*Second embodiment—FIGS. 3 and 4*

The second embodiment 22 differs from the first embodiment 8 by having an internal chamber 23 shaped as a truncated cone. Otherwise, the two embodiments are substantially the same and the same elements in each are identified by the same reference numbers.

In this second embodiment, the passageways 18 deliver liquid streams tangentially to the conoidal sides 24 of the chamber 23 near its upper truncated end 25 and these streams combine in the chamber 23 to form a rotating conoidal film which moves downwardly through the open lower outlet end 26 of the chamber 23. Upon reaching the inside of the tube 3, this conoidal film is formed into a cylindrical film which completely covers and wets the interior surface of the tube from the lower end 26 of the ferrule 22 to the bottom of the tube 3.

Having described the invention, it is claimed:

1. A liquid distributing device for use in the upper end of an upright tube in a vertical tubular heat exchanger comprising: a hollow ferrule body having a top wall, an upper head portion and a lower circular neck portion joined together, the neck portion being dimensioned to fit snugly within the upper end of said tube, the head portion being of relatively larger size to provide, along the outer side of the ferrule at the juncture of the head and neck, a circumferentially-extending downwardly-facing shoulder for seating the ferrule upon the upper end of said tube, said hollow ferrule body containing an internal chamber which is closed at its top by the top wall of said upper head portion and which is circumferentially defined by the vertical side walls of said head and neck portions, said side walls presenting to said chamber a circular inner-peripheral surface extending around a centrally disposed vertical axis, said chamber also being wide open at its bottom to provide unobstructed downward communication with the interior of said tube; and at least one liquid inlet passageway in the head portion of said body, said passageway extending from an inlet opening in the outer vertical side wall of said head portion to a tangentially arranged discharge opening in the head portion of said circular surface so that water is discharged from said passageway into said chamber in a substantially horizontal direction extending substantially tangentially to the circular peripheral surface of said chamber.

2. The ferrule of claim 1 wherein: said chamber is shaped as a vertical cone.

3. The ferrule of claim 1 wherein: said chamber is shaped as a vertical cylinder; and the lower end portion of said ferrule, surrounding the open lower end of said chamber, is beveled downwardly and outwardly to provide an annular band-like chamfered surface between the circular cylindrical surface of said chamber and the lower edge of said ferrule.

References Cited in the file of this patent

UNITED STATES PATENTS

| | | |
|---|---|---|
| 1,184,936 | Falkenwalde | May 30, 1916 |
| 2,347,123 | Riesgo | Apr. 18, 1944 |
| 2,705,972 | Vawter | Apr. 12, 1955 |